April 30, 1968  J. MULLER  3,380,591

FLUID FILTER WITH AUTOMATIC CLEANING DEVICE

Filed May 31, 1966  3 Sheets-Sheet 1

INVENTOR
JACQUES MULLER

BY
ATTORNEY

April 30, 1968     J. MULLER     3,380,591
FLUID FILTER WITH AUTOMATIC CLEANING DEVICE
Filed May 31, 1966     3 Sheets-Sheet 2
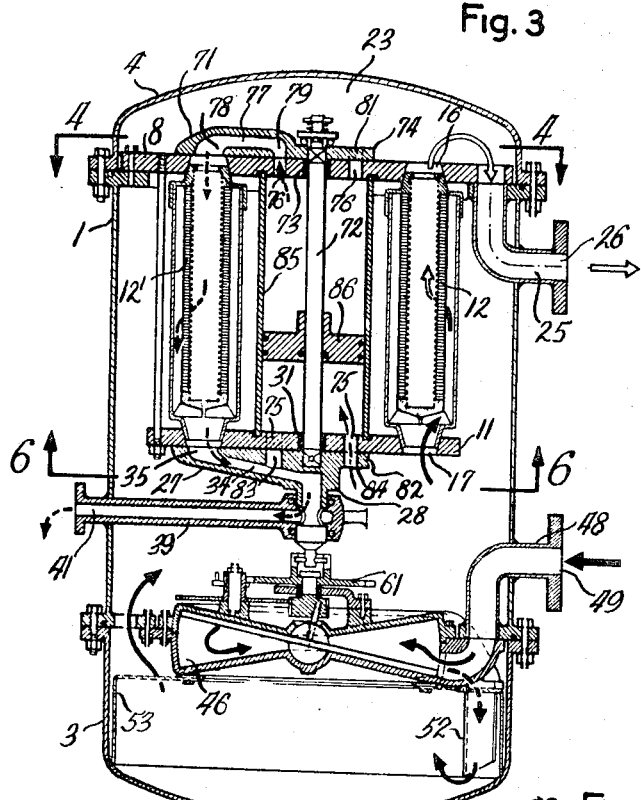
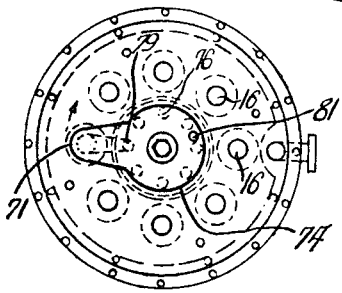
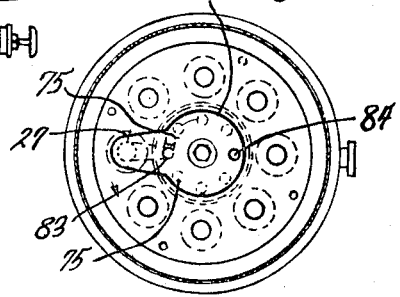
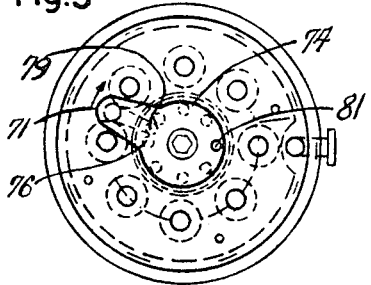
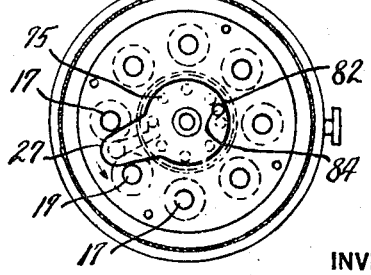
INVENTOR
JACQUES MULLER
BY *André B Colin*
ATTORNEY

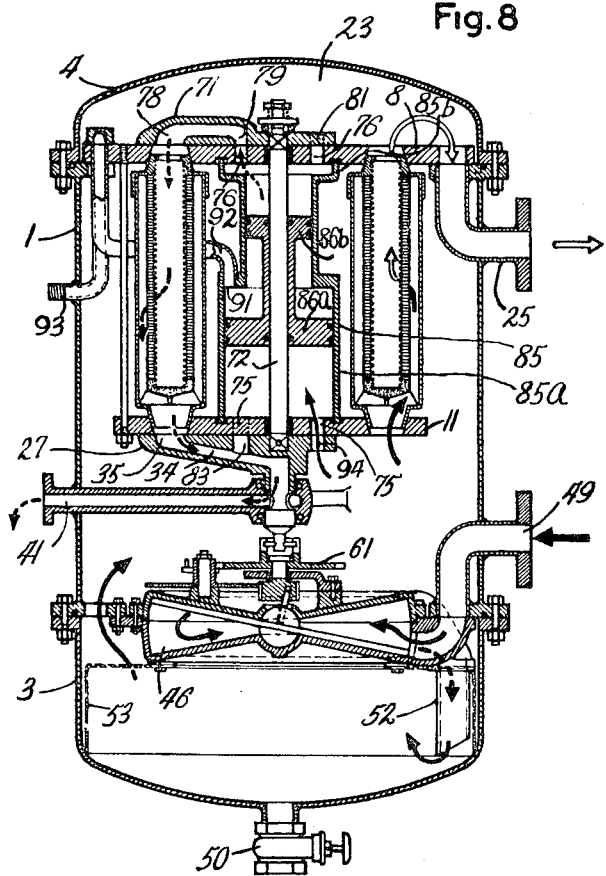

United States Patent Office 3,380,591
Patented Apr. 30, 1968

3,380,591
FLUID FILTER WITH AUTOMATIC
CLEANING DEVICE
Jacques Muller, La Garenne-Colombes, Hauts-de-Seine,
France, assignor to Reliumit, Inter, S.a.r.L., La Garenne-Colombes, Hauts-de-Seine, France, a corporation of
France
Filed May 31, 1966, Ser. No. 554,054
Claims priority, application France, June 11, 1965,
20,445
4 Claims. (Cl. 210—143)

ABSTRACT OF THE DISCLOSURE

Filtering or separating equipment, particularly that type in which a filter device consists of a stack of grooved discs or washers through which the fluid is passed, having self-contained cleaning means which automatically and rapidly effect cleaning of a plurality of the filter elements used in the equipment, one at a time, while the filtering occurs, said cleaning means being driven by a hydraulic motor mounted in the housing.

---

This invention relates to the art of filtering equipment, more particularly of the type having an automatically operated self-contained cleaning means for the filters incorporated therein.

As conducive to an understanding of the invention, it is noted that where fluid filters or separators are used of the type for example shown in Patent No. 3,214,368, in which the filter device consists of a stack of grooved discs or washers through which the fluid is passed, where the sediment or particles in the fluid (hereinafter generally referred to as particles) during use of the filter, clogs the grooves or passageways of the stack of washers so that no further fluid can pass therethrough, if the equipment must thereupon be disassembled and the filters removed for cleaning, such procedure is extremely time consuming and reduces the efficiency of the equipment.

It is accordingly among the objects of the invention to provide a filtering or separating equipment with self-contained cleaning means which will automatically and rapidly effect cleaning of the plurality of the filter elements used in the equipment, one at a time while the filtering occurs, so that the continuous filtering operation will not be interrupted, which cleaning action does not require disassembly of the equipment and hence avoids the need of skilled mechanics for this purpose and which does not require any additional power source other than the unfiltered fluid that is to be filtered by the equipment.

According to the invention, these objects are accomplished by the arrangement and combination of elements hereinafter described and more particularly recited in the claims.

In the accompanying drawings in which are shown one or more of various possible embodiments of the several features of the invention:

FIG. 3 is a view similar to FIG. 1 of another embodiment of the invention;

FIG. 4 is a transverse sectional view taken along line 4—4 of FIG. 3;

FIG. 5 is a view similar to FIG. 4 showing a bypass arm of the automatic cleaning mechanism in another position;

FIG. 6 is a transverse sectional view taken along line 6—6 of FIG. 3;

FIG. 7 is a view similar to FIG. 6 showing a bypass arm of the automatic cleaning mechanism in another position, and FIG. 8 is a view similar to FIGS. 1 and 3 of still another embodiment of the invention.

Figure 1:
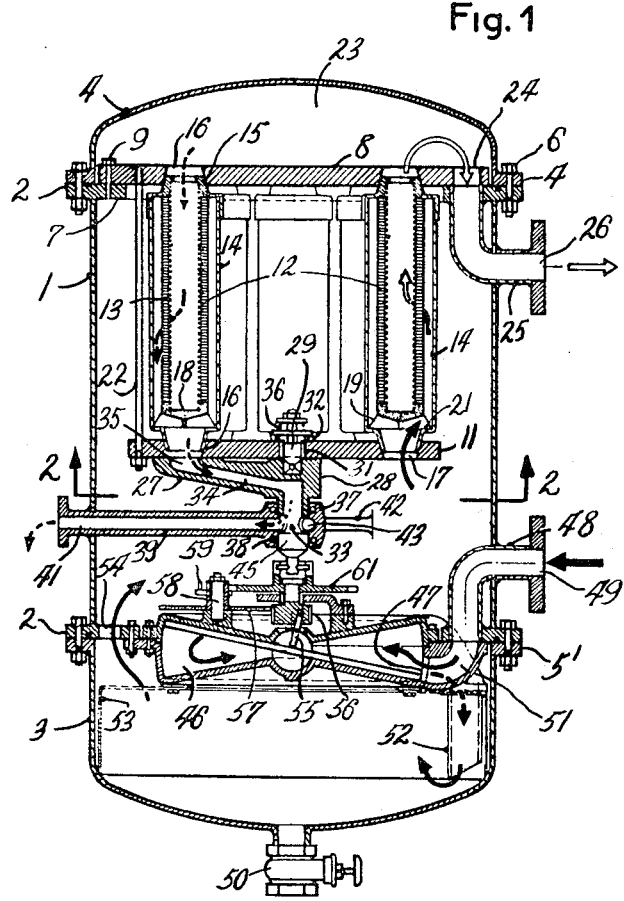
FIG. 1 is a longitudinal sectional view of a filter having an automatic cleaning system according to one embodiment of the invention.
Figure 2:
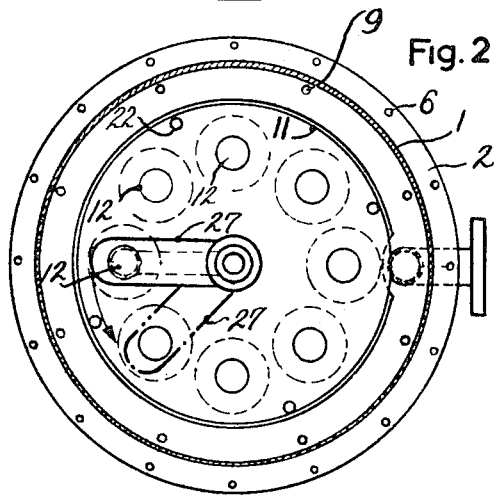
FIG. 2 is a transverse cross section taken along line 2—2 of FIG. 1.

Referring now to the drawings, in the embodiment shown in FIGS. 1 and 2, the filter comprises a housing 1 having an annular connecting flange 2 at each end. The ends of the housing are closed by means of cup-shaped bottom and top covers 3 and 4, each of which also has an annular connecting flange 5 and 5′ which are secured to the corresponding flanges 2 by bolts 6.

The flanges 2 also extend inwardly into the housing 1 as at 7 and the flange portion 7 adjacent the top cover 4 has mounted thereon a plate 8 which is secured in position by bolts 9. Supported between the plate 8 and a plate 11 positioned beneath the plate 8 are a plurality of filter elements 12 arranged in a circle and circumferentially spaced as shown.

Each of the filter elements comprises a stack of grooved discs or washers 13 such as is shown in Patent No. 3,214,368. Each of the stacks of washers 13 is positioned in a cylindrical jacket 14. The upper end of each jacket 14 is defined by a substantially frusto conical end portion 15 which fits into a corresponding frusto conical opening 16 in plate 8, said end portion 15 having a central opening aligned with the bore of the stacked washers 13, the topmost washer of the stack abutting against the inner end of the end portion 15. The lower end of each of the jackets has a frusto conical portion 16′ which fits into a corresponding frusto conical opening 17 in plate 11. The lower end of the stack of washers is closed by an end cap 18 which has spaced legs 19 that rest on a shoulder 21 defined by the lower end of the jacket 14. The plates 8 and 11 are urged together by tie rods 22 which also serve to compress the individual washers 13 together.

The upper plate 8 serves to define a chamber 23 with respect to the top cover member 4 and has a port or opening 24 to which one end of a conduit 25 is connected, said conduit extending through the wall of the housing and defining the discharge port 26 for filtered fluid.

Positioned beneath the plate 11 is the automatic cleaning mechanism for the filter elements 12. Such mechanism comprises a bypass arm 27 extending laterally outward from a hub 28. The upper end of hub 28 carries a stud shaft 29 rigidly secured thereto and which extends through a central bearing opening 31 in plate 11, a ball bearing 32 providing ready rotation of said arm 27. The lower end of hub 28 has a vertical bore 33 in communication with a passageway 34 in arm 27 which terminates in an opening 35 in the top surface of the free end of arm 27. The opening 35 is of dimension slightly smaller than the openings 17 in the plate 4 and adapted to be successively aligned with the plurality of openings 17 as the arm 27 is rotated in the manner hereinafter to be described. The top surface of the free end of arm 27 defines a sliding seal with respect to the undersurface of plate 11, being retained against such undersurface by a spring 36 encompassing the stud shaft 29. The lower portion of hub 28 extends through a bearing 37 located in the vertical opening of a hub 38 positioned at the end of a horizontal conduit 39 which extends through the housing defining a discharge port 41. The hub 38 is rigidly supported by suitable braces 42 extending to the wall of the casing.

As shown in FIG. 1, the lower portion of hub 28 has a plurality of openings 43 aligned with an annular groove in hub 38 to which the bore of conduit 39 is connected so that at all times there will be communication between passageway 34 in arm 27 and conduit 39.

The hub 28 has a portion 45 at its lower end which extends beyond the hub 38 and by means of which the arm 27 is intermittently rotated as will now be described.

The drive mechanism for the arm 27 comprises a hydraulic motor 46 mounted in the housing 1 adjacent the lower end thereof. The motor which can be of any suitable type, has an inlet port 47 to which one end of a conduit 48 is connected, said conduit extending through the wall of the housing 1 and defining an inlet port 49 to which the fluid under pressure to be filtered is connected. The hydraulic motor 46 has an outlet port 51 to which a discharge conduit 52 is connected, the conduit 52 being directed toward the bottom of the filter unit, i.e., toward the bottom cover 3.

A metal cloth or filter member 53 is positioned in the bottom cover 3 beneath the motor 46 so that the fluid to be filtered after it drives the motor 46 and enters the bottom cover 3 may pass through the filter which will prevent passage of larger particles, and then flow through openings 54 in the support for the motor, into the housing 1 and then through all of the openings 17 in plate 11 which are not closed by the free end of arm 27. To drain the sludge collecting in the bottom cover 3, a valve 50 is provided controlling a suitable discharge port in the bottom cover member 3.

The motor 46 has a shaft 55 which rotates a pinion 56 that in turn rotates a gear 57 idly mounted on a stud shaft 58 rising from the body of motor 46. The hub of gear 57 carries a laterally extending arm with an upstanding pin 59 designed to engage the periphery of a Geneva drive plate 61, which plate is conformed so that with each engagement of the periphery of the plate 69 by pin 59, the end 45 of the hub 28 of arm 27 will be turned an amount so as to move the free end of arm 27 from alignment with one of the openings 17 in plate 11 into alignment with the next adjacent opening in plate 11. Thus, the arm will be moved intermittently step by step with continuous rotation of the hydraulic motor 46.

In the operation of the embodiment shown in FIG. 1, the fluid to be purified is forced under pressure through port 49 and it will flow into the hydraulic motor 46 to drive the latter and then discharge through conduit 52 into the lower end of the filter unit. The fluid will then flow through the filter screen 53, the coarser impurities being restrained by the screen and settling to the bottom of the unit. Fluid will then flow through the openings 54 into the main body of the housing 1 and then flow through all of the openings 17 except the one that is closed by the free end of arm 27. The fluid flowing through the openings 17 will flow up the respective jackets 14 of each of the filter elements and then will flow through the grooves of the stack of washers 12 into the bore of such stack. Thereupon, the filtered fluid will flow through the openings 16 into the chamber 23 and will be discharged through conduit 25 and port 26.

Due to the action of the filtering columns 12, the particles in suspension in the fluid will be restrained by reason of the dimensions of the grooves in the filter washers from passing through such grooves and only filtered fluid will flow into the bore of the filters for discharge from port 26. During the filtering action, as above described, which is continuous, the arm 27 will be rotated step by step so that its free end will be moved from position in alignment with one of the openings 17 into alignment with the next opening 17.

Each time the free end of the arm 27 is in alignment with one of the openings 17, no further fluid will of course flow into the associated filter element, and the other filter elements will continue to perform the filtering action. With respect to the filter element with which the arm 27 is aligned, due to the pressure of the filtered fluid in the chamber 23 at the top of the casing, a portion of such filtered fluid will be forced downwardly into the bore of the stack of washers associated with the filter element with which the arm is aligned.

As a result, the filtered fluid will now flow in reverse direction through the grooves of the stacked washers 12 and any particles that have obstructed or clogged the inlet of each of the grooves on the outer periphery of the stack of washers will be dislodged and drop down the jacket 14 to be conveyed by the filtered fluid that has passed in reverse direction through the stack 12, through the passageways 34 and 33 in arm 27 and thence through conduit 39 to be discharged from the port 41 into a collection tank.

From the foregoing description, it is apparent that the filtering operation will be continuous and the cleaning of successive filter elements will be intermittent, the fluid that is being filtered being also used to drive the hydraulic motor that operates the automatic cleaning mechanism.

The embodiment shown in FIG. 3 is similar in many respects to the embodiments shown in FIGS. 1 and 2 and hence will only be described to the extent necessary for a clear understanding of such an embodiment, corresponding elements having the same reference numerals as those in FIG. 1. In the embodiment shown in FIG. 3, the filter unit is provided with an automatic cleaning system consisting of two intermittently rotatable bypass arms 27 and 71, the arm 27 reacting against the bottom of plate 11 as described with respect to the embodiment of FIG. 1 and the arm 71 reacting against the top of plate 8.

As is clearly shown in FIG. 3, the plate 8 has a central opening axially aligned with the opening in plate 11 in which bearing 31 is positioned. The shaft 72 which corresponds to the stud shaft 29 of FIG. 1, extends through both of the plates 11 and 8 and is rotatably mounted in a bearing 73 in plate 8, the protruding end of shaft 72 being mounted in the same manner as the protruding end of stud shaft 29 of FIG. 1. Secured to the protruding end of shaft 72 is a disc 74 from which bypass arm 71 extends. Each of the plates 11 and 8 is provided with a plurality of ports or openings 75, 76 respectively, arranged in a circle coaxial with the shaft 72 and equidistantly spaced from each other. The openings 75, 76 are positioned along a line extending from the axis of shaft 72 through each of the openings 17, 16 in the plates 11 and 8 respectively, so that there are the same number of openings 75, 76 in each plate 11 and 8 as there are openings 17, 16. The upper bypass arm 71 has a passageway 77 therethrough terminating in a port 78 at its free end, of smaller diameter than the opening 16 and a port 79 at its inner end adapted to be moved into alignment with an associated opening 76. The disc 74 associated with arm 71 has an inlet opening 81 on the side of the disc opposed to the arm 71, which opening 81 when the port 78 of arm 71 is aligned with a port 16, will be positioned along a radial line midway between radial lines extending from the axis of shaft 72 through two adjacent openings 16 as shown in FIG. 4. The port 79 in arm 71 which is in communication with passageway 77 is adapted to be aligned with one of the openings 76 when the port 78 of arm 27 is aligned with an opening 16 as is clearly shown in FIG. 4.

The lower bypass arm 27 is similar to the arm 27 of FIG. 1, but has a discharge opening 83 at its inner end in communication with passageway 34 in arm 27. In addition, the arm 27 has a disc 82 from which arm 27 extends, which has an inlet opening 84 opposed to opening 83. The openings 83 and 84 are so positioned that when the port 35 of arm 27 is aligned with the associated opening 17 as shown in FIG. 6, the port 83 will be midway between two adjacent ports 75 and the port 84 will be aligned with one of the ports 75.

In addition, a cylindrical sleeve 85 is positioned between plates 11 and 8 defining a closed cylinder, the ends of said cylinder pressing tightly against the opposed inner faces of plates 11 and 8 and encompassing the rings of openings 75 and 76.

The shaft 72 which extends axially through the cylinder 85 slidably mounts a piston 86, the function of which will be hereinafter described.

The operation of the filter shown in FIG. 3 is similar in many respects to the operation of the filters shown in FIGS. 1 and 2. Thus, the unfiltered fluid is forced through port 49 to drive the hydraulic motor 46 and then discharges through conduit 52 into the lower end of the filter unit where it undergoes a first filtration through the screen 53. The partially filtered fluid then flows through the main portion of the housing 1 into the filter elements 12 to be discharged through the open ports 16 thereof into the chamber 23 and then out of the discharge port 26. By reason of the motor 46, the shaft 72 is rotated in an intermittent manner through the Geneva drive plate 61 to effect step by step movement of both of the arms 27 and 71 so that their respective openings 35, 78 move step by step into alignment with the openings 17, 16 respectively.

When the openings 35 and 78 of the arms 27 and 71 are at rest, aligned with one of the filter elements, for example, the filter element 12' shown in FIG. 3, a portion of the unfiltered fluid will pass through the aligned openings 84 and 75 in disc 82 and plate 11 to enter into the portion of cylinder 85 below the piston 86 thereof. This will cause the piston 86 to move upwardly in the cylinder to react against the filtered fluid contained in the upper portion of the cylinder which was charged therein when the openings 81 and 76 in disc 74 and plate 8 were aligned during the movement of arm 71 from one rest position to the next adjacent rest position. Since the associated openings 81 and 76 are closed when the arm 71 is at rest position over one of the filter elements 12 and the associated openings 79 and 76 are aligned, the filtered fluid in the upper part of the cylinder 85 will be forced by the upward movement of the piston 86 through such aligned openings 79 and 76 and through passageway 77 and opening 78 into the bore of the stacked washers of filter element 12' to flow in reverse direction through the grooves in such washers to dislodge the particles that have obstructed or clogged the inlet to each of the grooves on the outer periphery of the stack of washers. Such particles will then flow downwardly through the jacket into the opening 35 of arm 27 and pass through passageway 34 thereof to be discharged through conduit 39 and discharge port 41.

While this occurs, the partially filtered fluid will of course flow through the other filter elements 12 in manner described with respect to the embodiments shown in FIG. 1 to be filtered and discharged into chamber 23 and through discharge port 26.

When the motor 46 causes the ganged arms 27 and 71 again to rotate to the next position through the Geneva drive plate 61, during the course of such movement the openings 35 and 78 of arms 27 and 71 will be closed by the plates 11 and 8 and the ports 76 and 75 in plates 8 and 11 associated with openings 79 and 84 will be closed. At this time also, the upper portion of cylinder 85 above the piston 86 will be in communication with the chamber 23 through the associated aligned openings 81, 76 and the portion of the cylinder 85 below piston 86 will be in communication with the passageway 34 of arm 27 through the associated aligned openings 75 and 83.

As a result, it is apparent that as the arms 27 and 71 move from alignment with one of the filter elements into alignment with the next adjacent filter element, the fluid under pressure in chamber 23 which enters the upper portion of cylinder 85 will force the piston 86 downwardly, discharging the fluid beneath the piston through aligned openings 75 and 83 and through the vertical passageway in hub 28, thence through conduit 39 for discharge through port 41 into a collecting tank.

The embodiment shown in FIG. 8 is similar to the embodiment shown in FIG. 3 except that the single piston 86 of the embodiment of FIG. 3 is replaced by a differential piston assembly comprising pistons 86a and 86b, the former being of larger diameter than the latter. The cylinder 85 associated with pistons 86a, 86b has two axially aligned portions 85a, 85b, the former being of larger diameter than the latter to accommodate the associated pistons 86a, 86b. The larger diameter portion of the cylinder 85 defines an annular shoulder which has a port 91 connected by conduit 92 to discharge port 93 leading out of the housing 1, said conduit 92 defining an air vent between the pistons 86a, 86b.

The operation of the equipment shown in FIG. 8 is identical to that of the embodiment shown in FIG. 3 except that by reason of the larger diameter piston 86a, the pressure provided against the filtered fluid contained in the upper portion of cylinder 85 above piston 86b will be greater and provide for more effective cleaning of the filter elements.

With the equipments above described, it is apparent that continuous filtering action will be provided during the operation of the unit while at the same time there will be step by step cleaning of one of the filter elements at a time and the same fluid that is being filtered is used to effect such automatic cleaning operation.

As many changes could be made in the above equipments, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for filtering particles from fluids, comprising a container having a chamber at its upper end, having a floor defined by a plate extending transversely across the container spaced from the top wall thereof, said plate having a plurality of circumferentially spaced openings therthrough, said chamber having a discharge port for filtered fluid, a plurality of filter elements positioned in said container between said chamber and the lower end of said container and arranged in a circle circumferentially spaced from each other, each of said filter elements comprising a cylindrical jacket extending parallel to the longitudinal axis of said container, a filter column in each of said jackets, each filter column having a central bore in communication at its upper end with said plurality of circumferentially spaced openings, the lower end of said central bore being closed, said jacket having a closed upper end through which the bore extends and an open lower end, defining the inlet to the filter column therein, a second plate positioned in said container longitudinally spaced from the first plate and parallel thereto, said second plate having a plurality of circumferentially spaced openings aligned respectively with the openings in said first plate, the lower end of each of said jackets being in communication respectively with each of the openings in said second plate, said filter column permitting flow of fluid therethrough from the outer surface thereof into said bore but restraining passage of such particles, means to provide flow of unfiltered fluid into said container, a discharge port for said filter elements, an arm rotatable on an axis longitudinally aligned with the axis of said container and the axis of said circumferentially spaced filter elements, said arm having a passageway therethrough, the free end of said arm being movable in a circle aligned with said circumferentially spaced openings in said second plate and being retained against the undersurface of said second plate to define a sliding seal with respect thereto, the free end of said arm having an opening in communication with one end of the pasageway therein and movable into alignment with each of the openings in said second plate as said arm is rotated, the other end of said passageway having a port and a conduit leading from said filter column discharge port to the port at the other end of said passageway and in constant communication therewith, whereby the filtered fluid under pressure in said chamber will flow in reverse direction through said filter column in communication with said discharge port for cleaning of said filter column, a hydraulic motor in said container, said hydraulic motor having an inlet port and a discharge port, said casing having an inlet port to provide such flow of unfiltered fluid into said container, said casing inlet port being connected to the inlet port of said motor, the outlet port of said motor leading into said container and an intermittent drive mechanism operatively connected between said motor and said arm, said intermittent drive mechanism being conformed to effect step by step rotation of said arm to move the free end thereof from alignment with one of said openings in said second plate into alignment with an adjacent opening in said second plate with continuous rotation of said motor.

2. Equipment for filtering particles from fluids, comprising a container having a chamber at its upper end, having a floor defined by a plate extending transversely across the container spaced from the top wall thereof, said plate having a plurality of circumferentially spaced openings therethrough, said chamber having a discharge port for filtered fluid, a plurality of filter elements positioned in said container between said chamber and the lower end of said container and arranged in a circle circumferentially spaced from each other, each of said filter elements comprising a cylindrical jacket extending parallel to the longitudinal axis of said container, a filter column in each of said jackets, each filter column having a central bore in communication at its upper end with said plurality of circumferentially spaced openings, the lower end of said central bore being closed, said jacket having a closed upper end through which the bore extends and an open lower end, defining the inlet to the filter column therein, a second plate positioned in said container longitudinally spaced from the first plate and parallel thereto, said second plate having a plurality of circumferentially spaced openings aligned respectively with the openings in said first plate, the lower end of each of said jackets being in communication respectively with each of the openings in said second plate, said filter column permitting flow of fluid therethrough from the outer surface thereof into said bore but restraining passage of such particles, means to provide flow of unfiltered fluid into said container, a discharge port for said filter elements, an arm rotatable on an axis longitudinally aligned with the axis of said container and the axis of said circumferentially spaced filter elements, said arm having a passageway therethrough, the free end of said arm being movable in a circle aligned with said circumferentially spaced openings in said second plate and being retained against the undersurface of said second plate to define a sliding seal with respect thereto, the free end of said arm having an opening in communication with one end of the passageway therein and movable into alignment with each of the openings in said second plate as said arm is rotated, the other end of said passageway having a port and a conduit leading from said filter column discharge port to the port at the other end of said passageway and in constant communication therewith, whereby the filtered fluid under pressure in said chamber will flow in reverse direction through said filter column in communication with said discharge port for cleaning of said filter column, a second arm is positioned in said chamber and rotatable on an axis aligned with the axis of said first arm, said arms being ganged to move in unison, said second arm having a passageway therethrough, the free end of said second arm being movable in a circle aligned with the circumferentially spaced openings in said first plate and being retained against the top surface of said first plate to define a sliding seal with respect thereto, the free end of said second arm having an opening in communication with one end of the passageway therein and movable into alignment with each of the openings in said first plate as said second arm is rotated, a cylinder positioned between said pair of plates, axially aligned with said filter elements and inwardly thereof, piston means slidably mounted in said cylinder, and means to charge the portion of said cylinder above said piston means with filtered fluid while the free ends of said arms are moved from alignment with one set of aligned openings in said plates, into alignment with the next adjacent set of openings, to move said piston means downwardly and means when said arms are in alignment with a set of openings, to move said piston means upwardly to force the filtered fluid in the upper portion of said cylinder through the passageway in said second arm and through the associated filter column to clean said filter.

3. The combination set forth in claim 2 in which the means to effect movement of said piston means comprises a plurality of circumferentially spaced openings in each of said plates inwardly of said cylinder and in communication therewith, each of said arms having an axial disc portion from which the associated arm extends and an inner opening leading into the passageway in the associated arm inwardly of the free end thereof, each disc portion having an outer opening positioned on the side of the disc opposed to the inner opening, said inner and outer openings being arranged with respect to the circumferentially spaced openings inwardly of said cylinder so that when the free ends of the arms are aligned with the associated openings in the plates, the inner openings in the first and second arms will respectively be out of alignment with and in alignment with an associated one of said circumferentially spaced openings inwardly of said cylinder, and the outer openings in said discs will respectively be in alignment with and out of alignment with an associated one of said circumferentially spaced opening inwardly of said cylinder.

4. The combination set forth in claim 2 in which said piston means comprises a pair of rigidly connected axially aligned pistons, the piston adjacent the upper portion of said cylinder being of smaller diameter than the piston adjacent the lower portion of said cyinder, said cylinder having two adjacent portions of diameter corresponding to the diameter of the piston slidable therein and means to vent the portion of said cylinder between the two pistons therein.

References Cited

UNITED STATES PATENTS

| | | | |
|---|---|---|---|
| 2,767,851 | 10/1956 | Muller | 210—333 X |
| 3,169,109 | 2/1965 | Hirs | 210—333 X |
| 3,176,846 | 4/1965 | Adams | 210—333 |
| 3,228,528 | 1/1966 | Mummert et al. | 210—333 |
| 3,280,980 | 10/1966 | King | 210—333 X |
| 3,283,903 | 11/1966 | Muller | 210—108 |

REUBEN FRIEDMAN, *Primary Examiner.*

J. ADEE, *Examiner.*